Nov. 25, 1930.   R. J. GITS   1,782,891
AUTOMOBILE BRAKE
Filed July 13, 1929   3 Sheets-Sheet 3
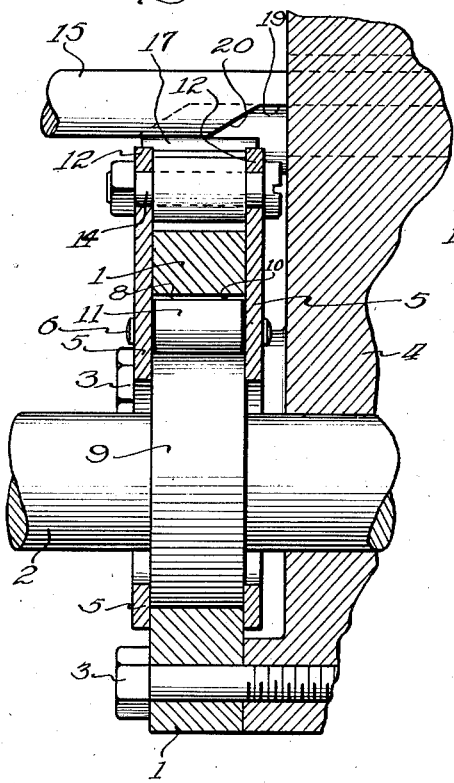
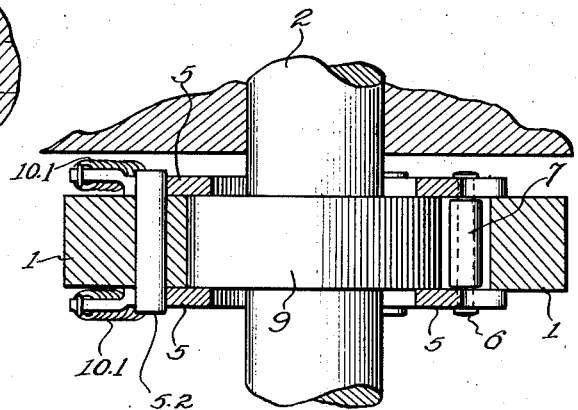
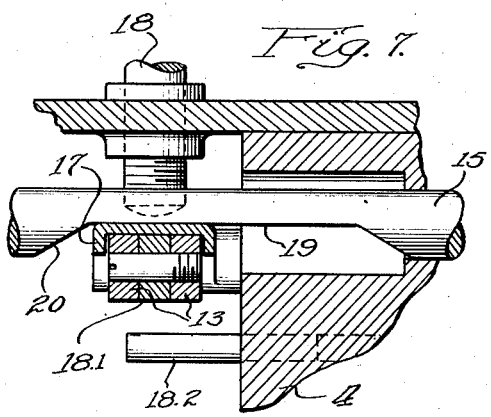
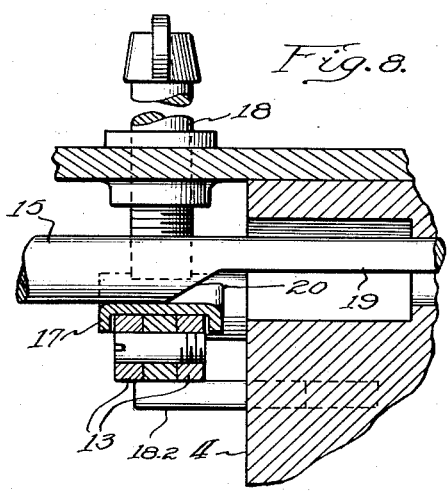
Inventor
Remi J. Gits, Patented Nov. 25, 1930.

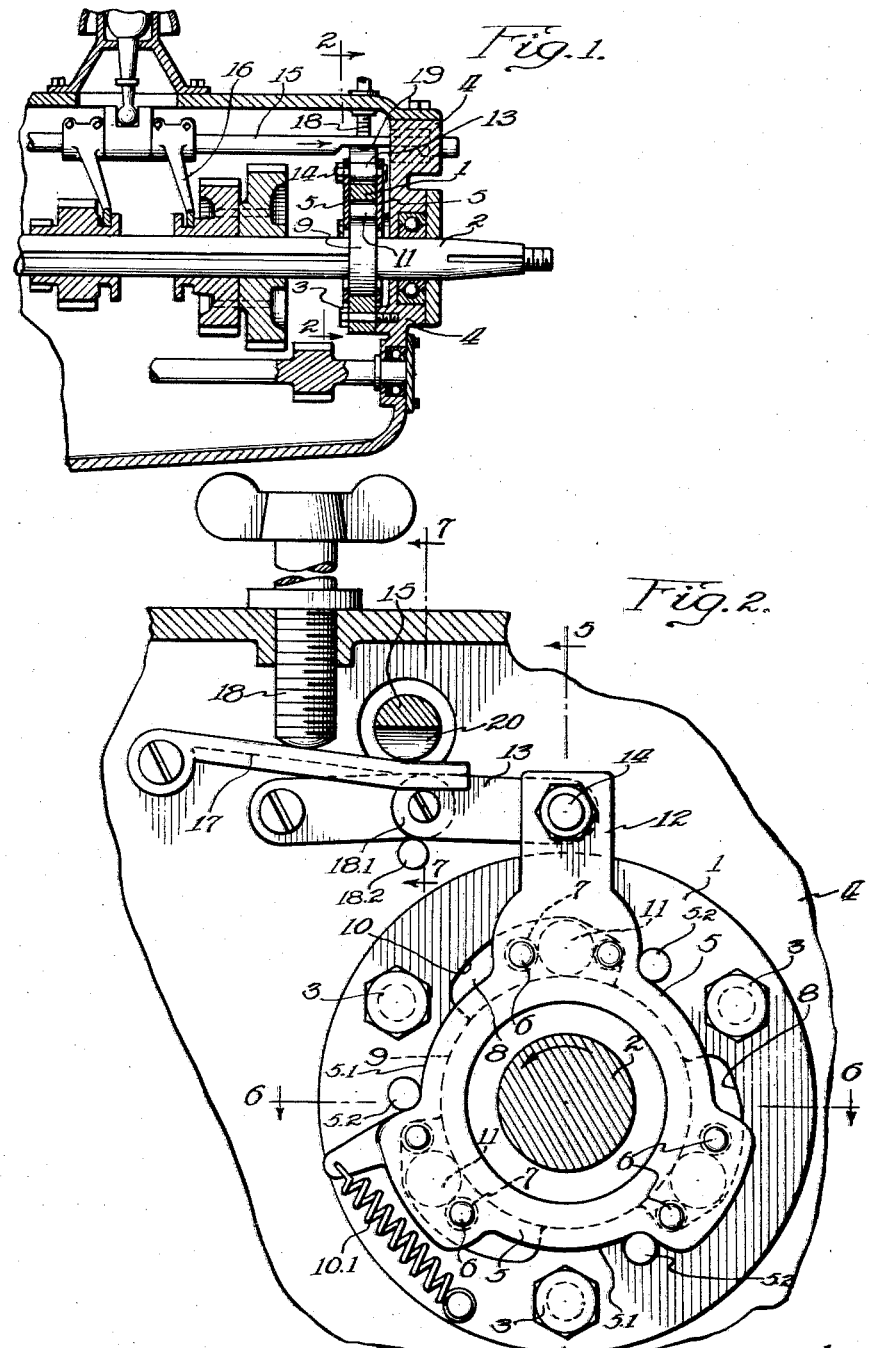

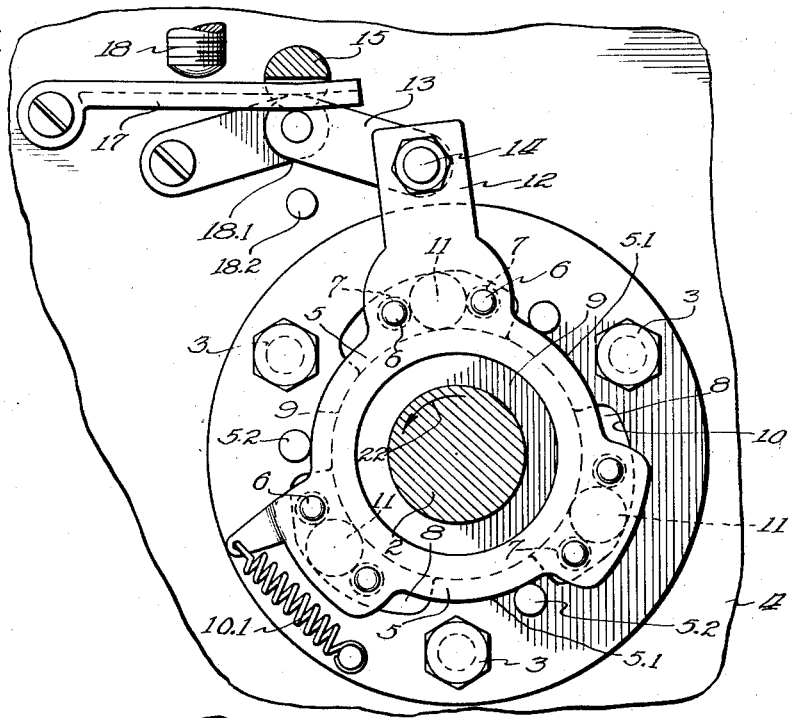
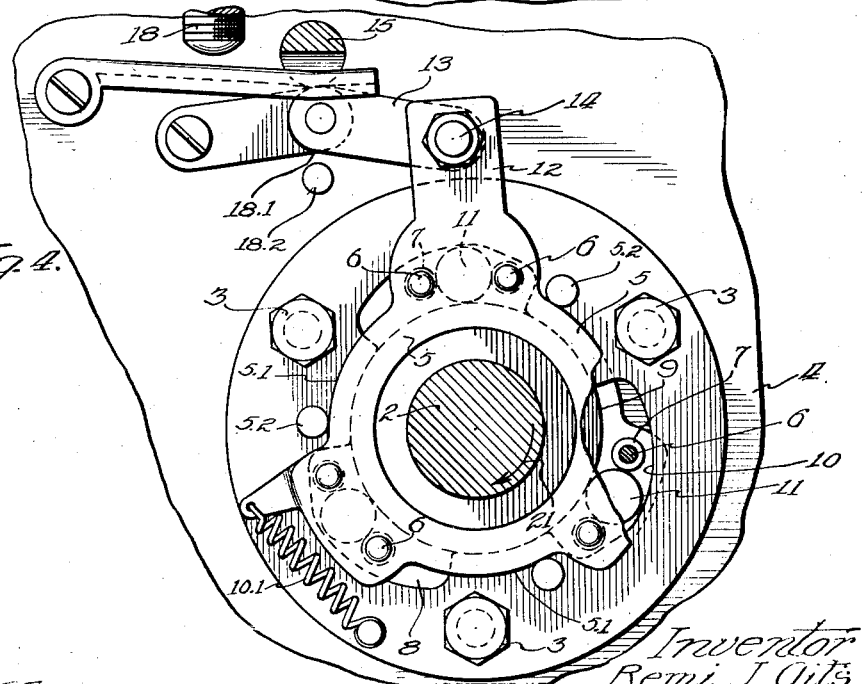

1,782,891

UNITED STATES PATENT OFFICE

REMI J. GITS, OF CHICAGO, ILLINOIS

AUTOMOBILE BRAKE

Application filed July 13, 1929. Serial No. 378,141.

This invention relates to that class of automobile brakes which are designed to automatically become effective when the vehicle starts to roll backward on a down-grade, and has a connection to the gear shift lever, whereby the brake means is rendered inoperative as desired, and particularly when the gear shift lever is placed in position for engaging the reverse gear.
The purposes of the invention are to provide an improved symmetrical and simple brake means of this class and in which the braking force is applied uniformly at a plurality of different points around the driven member to which the brake is applied, so as to prevent any tendency toward radial displacement of such driven member with an accompanying bending strain on its shaft.

The objects of the invention are accomplished by a construction as shown in the drawing, in which:

Figure 1 is a fragmentary vertical section of a vehicle transmission mechanism embodying my improved brake.
Fig. 2 is an enlarged fragmentary vertical section taken on the line 2—2 of Fig. 1, showing the brake parts in a released position.

Fig. 3 is a section similar to Fig. 2 showing the braking mechanism in its operating position for preventing backing.

Fig. 4 is a section similar to Fig. 2 showing the braking mechanism in position with forward rotation of the shaft.
Fig. 5 is a fragmentary vertical section taken on the line 5—5 of Fig. 2.

Fig. 6 is a fragmentary horizontal section taken on the line 6—6 of Fig. 2.

Fig. 7 is a fragmentary vertical section taken on the line 7—7 of Fig. 2.

Fig. 8 is a fragmentary section similar to Fig. 7 showing the parts in a changed position.

The herein described braking device utilizes the principle common in roller clutches, wherein a plurality of rollers located at equal distances apart around a driven shaft or other rotating device are caused to grip the same upon one direction of rotation of the shaft, due to the rollers wedging between the driven member and inclined surfaces of a fixed associated member. The braking device is arranged to coact with a collar fixed to the propeller shaft of the vehicle and is preferably supported on the rear end of the transmission gear housing. It consists of a hardened ring surrounding a propeller shaft and bolted to the gear houing, the inner surface of the ring being cut out to provide a plurality of inclined surfaces between which and a collar fixed to the propeller shaft are the gripping rollers. Mounted for angular adjustment at the faces of the stationary clutch ring is a pair of gripping roller control members, which carry pins for engaging the gripping rollers so that the latter may be retained in its inoperative position or permitted to grip or be positively disengaged.

In the specific construction illustrated in the drawings, the numeral 1 indicates the hardened fixed ring surrounding the propeller shaft 2, and which is bolted at 3 to the transmission gear housing 4. The transmission housing is provided with bosses at the location of the bolts 3 in order to space the ring 1 the required distance from the housing to allow for one of the pair of members 5 constituting part of the gripping roller adjustment means. The other member 5 is of the same construction and is located at the opposite face of ring 1.

The members 5 are rigidly secured together by rivets 6, on which are journaled sleeves 7, passing through the openings 8 cut through the ring 1 and adjacent the hardened collar 9 fixed to the propeller shaft 2. The openings 8 are inclined as indicated by the line 10 so that the gripping rollers 11 may wedgingly engage between the surfaces 10 of ring 1 and the outer annular surface of collar 9.

A spring 10.1 attached at one end to the adjusting members 5 and at its other end to the fixed ring 1 yieldably retains the adjusting members in the position shown in Fig. 3 so as to hold the gripping rollers 11 in engagement with the inclined surface 10 of the ring 1 and the periphery of the collar 9.

The adjusting members 5 are provided with outwardly extending parts 12, to which one end of a toggle 13 is pivotally secured by a bolt 14. The toggle is located below and extends transversely of a shift rod 15 which carries an arm 16 for moving the reverse gear of the transmission into and out of an operating position and the other end of the toggle is pivotally secured to the gear housing 4. The parts 5 have annular surfaces 5.1 which ride on and are carried by spaced pins 5.2.

Pivotally mounted on the gear housing 4 is a lever 17 having a channel in which a joint 18.1 of the toggle is seated and which normally rests freely upon the toggle 13 permitting it to assume the buckled position shown in Fig. 3. Stop pin 18.2 limits the throw of joint 18.

A manually operable set screw 18 is provided for bearing upon the lever 17 so as to straighten the toggle 13, rotate the adjusting members 5 to the position shown in Fig. 2 and render the braking mechanism inoperative. Formed in the shift rod 15 is a groove 19 which registers with the lever 17 when the rod 15 is in its forward speed and neutral positions as shown in Figs. 3 and 7, and which permits the toggle to assume an angular position. The groove 19 has an inclined extremity 20 for engaging the lever 17 when the shift rod is moved to its reverse position for rocking the lever to straighten the toggle. This action renders the brake mechanism inoperative when the reverse gear is in a driving position.

In operation, the braking mechanism is normally in the position illustrated in Fig. 4 when the driving shaft 2 is propelling a vehicle forwardly by rotation in the direction indicated by the arrow 21. Rotation of the shaft in this direction carries the gripping rollers 11 to the large ends of the recesses 8 in the fixed ring 1 where there is sufficient space between the periphery of the collar 9 and the outer wall of the recess to permit free rolling of the gripping rollers. When the shaft 2 rotates in the reverse direction indicated by the arrow 22 in Fig. 3 the gripping rollers 11 are driven into the restricted ends of the recesses 8 where they wedge between the periphery of the collar 9 and the inclined surfaces 10 of the fixed ring 1. This action positively secures the drive shaft and the vehicle wheels with which it is connected against reverse rotation.

The brake mechanism may be rendered inoperative by adjusting the set screw 18 to bear upon the lever 17 and hold the toggle 13 in a substantially straight position. This action rocks the adjusting rings 5 relative to the fixed ring 1 and retains the gripping rollers 11 in the enlarged ends of the recesses 8.

The brake mechanism is automatically rendered inoperative by the shift rod 15 when the gear shift lever is moved to its reverse position. The groove 19 of the shift rod is of sufficient length to accommodate the lever 17 when the rod is in both forward speed and neutral positions but when the rod 15 is moved to a reverse speed position the inclined extremity 20 of the slot rocks the lever 17 and straightens the toggle 13. This action has the same effect as the manual adjustment of the set screw 18.

Although but one specific embodiment of this invention is herein shown and described, it will be understood that various details of the construction shown may be altered or omitted without departing from the spirit of this invention as defined by the following claims.

I claim:

1. In an automobile braking device of the class described, a propeller shaft provided with an annular braking surface, a fixed braking ring surrounding said braking surface and having inclined surfaces facing said braking surface, gripping rollers located between said braking ring and said braking surface, control means for positioning said rollers between the braking surface and braking ring into wedging relation therewith for one direction of rotation of the shaft, and means for manually adjusting said control means to hold the rollers in inoperative position.

2. In an automobile braking device of the class described, the combination with gear transmission mechanism comprising a driving shaft, gear shift mechanism and a casing of a stationary brake member surrounding said shaft and secured to said casing, an adjustable brake member movably mounted on said stationary member comprising means coacting between said shaft and said stationary brake member to secure said shaft against rotation in one direction, and means on said adjustable brake member operable by said gear shift mechanism for rendering the braking device inoperative when the transmission mechanism is shifted into reverse gear.

3. In an automobile braking device of the class described, the combination with gear transmission mechanism comprising a driving shaft, gear shift mechanism and a casing, of a drum mounted on said casing comprising angularly spaced inclined brake surfaces, an adjustable brake member movably mounted on said drum, means on said adjustable member for coacting between said shaft and said inclined brake surfaces for securing said shaft against rotation in one direction, and means on said adjustable brake member operable by said gear shift mechanism for rendering said braking device inoperative when the transmission mechanism is shifted into reverse gear.

4. In an automobile braking device of the class described, the combination with gear transmission mechanism comprising a driving shaft, gear shift mechanism and a casing, of a drum mounted on said casing comprising angularly spaced inclined brake surfaces, an adjustable brake member movably mounted on said drum, means on said adjustable member for coacting between said shaft and said inclined brake surfaces for securing said shaft against rotation in one direction, manually operable means for rendering said braking device inoperaive, and means on said adjustable brake member operable by said gear shift mechanism for rendering said braking device inoperative when the transmission mechanism is shifted into reverse gear.

5. In an automobile braking device of the class described, the combination with gear transmission mechanism comprising a driving shaft, gear shift mechanism and a casing, of a drum mounted on said casing comprising angularly spaced inclined brake surfaces, an adjustable brake member movably mounted on said drum, means on said adjustable member for coacting between said shaft and said inclined brake surfaces for securing said shaft against rotation in one direction, a toggle mounted in said casing and pivotally connected to said adjustable brake member, and a lever pivotally mounted on said casing and acting on said toggle, said lever being operable by said gear shifting mechanism for rendering said braking means inoperative when said transmission mechanism is shifted to reverse gear.

6. In an automobile braking device of the class described, the combination with gear transmission mechanism comprising a driving shaft, gear shift mechanism and a casing, of a drum mounted on said casing comprising angularly spaced inclined brake surfaces, an adjustable brake member movably mounted on said drum, means on said adjustable member for coacting between said shaft and said inclined brake surfaces for securing said shaft against rotation in one direction, a toggle mounted on said casing and pivotally connected to said adjustable brake member, a lever pivotally mounted on said casing and acting on said toggle, said lever being operable by said gear shifting mechanism for rendering said braking means inoperative when said transmission mechanism is shifted to reverse gear, and a set screw in said casing for rendering said braking means inoperative independently of said transmission mechanism.

7. In an automobile braking means of the class described, the combination with gear transmission mechanism comprising a shift rod, a drive shaft, a collar and a transmission casing, of a stationary brake drum surrounding said collar having angularly spaced inclined brake surfaces, an adjustable brake member movably mounted on said drum comprising means for wedging between said inclined surfaces and said collar to secure said shaft against rotation in one direction, and means operable by said shift rod for rendering said braking means inoperative when said shift rod is moved to a reverse speed position.

Signed at Chicago this 11th day of July, 1929.

REMI J. GITS.